Aug. 20, 1929.  E. S. RUSH  1,725,374
PILOT CONTROLLED DEMAND METER
Filed Sept. 10, 1927
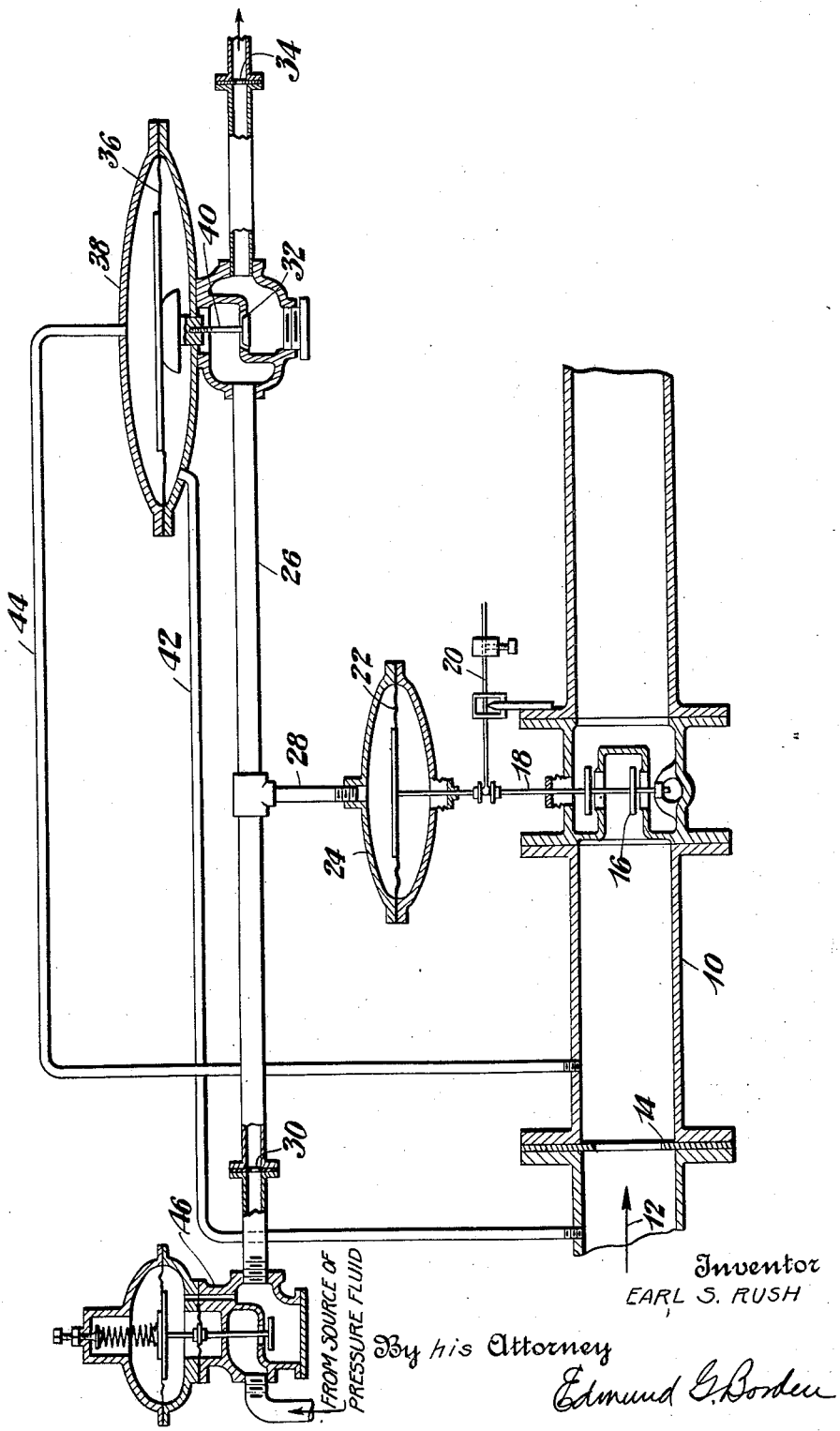
Inventor
EARL S. RUSH
By his Attorney
Edmund G. Borden Patented Aug. 20, 1929.

1,725,374

UNITED STATES PATENT OFFICE.

EARL S. RUSH, OF ERIE, PENNSYLVANIA, ASSIGNOR TO DOHERTY RESEARCH COMPANY, OF NEW YORK, N. Y., A CORPORATION OF DELAWARE.

PILOT-CONTROLLED DEMAND METER.

Application filed September 10, 1927. Serial No. 218,847.

The present invention relates to limiting the flow of gas or other fluid in a gas main.

It has been proposed heretofore to limit the flow of gas to individual consumers by devices suitable for this purpose. When, however, it has been attempted to use flow limiting devices in large gas mains, or like conduits, practical difficulties have been encountered in the way of pressure pulsations caused by the too rapid action of the limiting valve. Difficulty has been encountered also in large scale flow limiting apparatus due to "hunting" or rapid movements of the flow limiting valve under certain conditions of operation.

The present invention has as one of its principal objects the provision of an arrangement adapted to limit the flow of gas in a main to a given maximum without producing troublesome pressure pulsation.

Another object of the present invention is to provide an apparatus adapted to limit the flow of gas in a main, but free from tendency to troublesome "hunting".

The novel features of the present invention are pointed out with particularity in the appended claims. The invention itself, however, together with further objects and advantages, will best be understood from the following description taken with the accompanying drawing in which The figure of the drawing is an elevation of an apparatus according to the present invention, parts being broken away and parts being shown in section for purposes of illustration.

In the drawing, 10 is a gas main in which it is desired to limit the rate of flow to a predetermined maximum or limit. It is assumed that the fluid flows through main 10 in the direction indicated by the arrow 12. In the main 10 is placed a means for creating a pressure difference varying with the rate of flow of the gas. As illustrated, said means comprises a flow restricting means or orifice plate 14 in main 10 which serves to cause a drop in pressure in the gas passing through the plate proportional to the rate of flow of the gas. Other means are known for creating a pressure increasing with the flow in a main and may be used instead of an orifice plate. According to the present invention, when the flow of gas reaches a given predetermined rate or maximum limit, means controlled by a drop in pressure at the orifice plate 14 serves to check the flow of gas so that it will not rise above the predetermined rate or demand limit. The means for limiting the flow of gas just mentioned comprises a valve 16 placed in the main 10 so that the gas flows through the plate 14 and valve 16 in series, plate 14 being preferably in advance of valve 16. Preferably valve 16 is of the balanced or double beat type as illustrated. Valve 16 includes a stem 18 having a weighted lever 20 connected thereto for normally holding the valve 16 in open position. The closing movement of the valve 16 is controlled by the drop in pressure through the orifice plate 14, the means for causing a movement of the valve 16 in the closing direction including a diaphragm 22 connected to one end of the rod 18 and mounted in a casing 24. In the arrangement illustrated, the under side of the diaphragm 22 is exposed to atmosphere, but its upper side is exposed to pressure from an auxiliary conduit or pipe 26. Pressure from pipe 26 is introduced into casing 24 above diaphragm 22 through a pipe connection 28. The auxiliary conduit or pipe 26 contains an orifice plate or flow restricting means 30 and an automatically operated valve 32, pipe 28 being connected into pipe 26 intermediate the plate 30 and valve 32. Pipe or conduit 26 contains also a flow restricting means or orifice plate 34. The pipe 26 will be understood to be connected to a means normally producing a flow therein in the direction from the plate 30 through the valve 32 and thence through the plate 34. It will be understood also, assuming the means for producing flow in pipe 26 to be a source of fluid under pressure, that the orifice in the plate 30 is considerably smaller than that in the plate 34, with the result that the pressure in the pipe 26 at a point intermediate plate 30 and valve 32 depends upon and is regulated by the position of the valve 32. If the valve 32 is closed, the pressure in pipe 26 may build up to a maximum equal to that of the source of supply to which the pipe 26 is connected, whereas if the valve 32 is fully open the pressure in the pipe 26 will reduce to only a fraction of its maximum value owing to the fact that the fluid escapes more readily through the orifice plate 34 than it enters through the plate 30. Consequently, the pressure operating on the upper face of diaphragm 22, and which is the same as that in the pipe 26 between plate 30 and valve 32, varies with the position of the valve 32. The position of valve 32 is controlled by the pressure drop through the plate 14 in main 10. In the arrangement illustrated, the means for controlling valve 32 includes a weighted diaphragm 36 mounted in a casing 38 and connected to the stem 40 of the valve 32. The diaphragm 36 is exposed on its under side to the pressure in main 10 on the inlet or high pressure side of the orifice plate 14. The pipe 42 conducts the gas from the main 10 on the high pressure side of the plate 14 to the under side of diaphragm 36. In a similar way, the top of diaphragm 36 is exposed to pressure in main 10 on the outlet or low pressure side of the plate 14, pipe 44 serving to conduct gas from the main 10 on the low pressure side of plate 14 into the upper half of the casing 38.

The operation of the apparatus above described will be obvious to those skilled in the art from the foregoing description. For purposes of convenience, however, the operation of the particular embodiment of the invention herein disclosed may be described as follows:

So long as the flow through the main 10 is below the given maximum the weighted lever 20 overbalances the pressure against the upper face of diaphragm 22 and holds the valve 16 wide open. As the flow approaches the maximum, the drop in pressure through the plate 14 increases, the pressure difference in the two sides of the plate 14 being transmitted to diaphragm 36 by pipes 42 and 44 in such manner as to tend to close valve 32. When the difference in pressure on opposite sides of diaphragm 36 overcomes the weight connected to this diaphragm, valve 32 begins to close and the pressure in pipe 26 between plate 30 and valve 32 thereupon begins to rise. The pressure against the upper face of diaphragm 22 thereupon increases until it overcomes the effect of the weighted lever 20 and closes valve 16 enough to hold the drop through plate 14 at a certain fixed value thereby limiting the flow of fluid to valve 16 in the main 10 to a predetermined maximum. When the flow in main 10 again drops below the maximum for which the apparatus is designed, valve 32 opens, resulting in reducing the pressure on diaphragm 22 and the opening of valve 16 in main 10.

The apparatus previously described produces a gradual change in pressure against operating diaphragm 22 with changes in flow in main 10 and therefore has little tendency to produce sudden movements of the valve 16 such as would cause pressure pulsations in the main 10. Also, "hunting" of the valve 16 is not apt to occur for the same reason. However, under some circumstances it has been found advisable to place a small pressure regulator 46 in the pipe 26 at a point prior to the plate 30 in the direction of the gas flow, so that the orifice in plate 30 shall be under a substantially constant pressure. In this way all substantial tendency to the production of pressure pulsations in the main 10 or "hunting" of the valve 16 is eliminated. Pressure regulator 46 is illustrated as of a known type and will not be described in detail.

The fluid passed through the pipe 26 may be taken from any convenient source and may be discharged into the atmosphere. If desired, pipe 26 may be connected to the main 10 at a point prior to the orifice plate 14 and may be connected into the main 10 at some other point following the valve 16 in the direction of the gas flow. Also, the pipe 26 may be connected to a source of gas under pressure other than the main 10 and pipe 26 connected to the main 10 following the valve 16, assuming that the gas in pipe 26 is of a suitable pressure and character. When pressure regulator 46 is used, this regulator is the source of supply of fluid for auxiliary conduit or pipe 26, the fluid discharged from regulator 46 passing directly into pipe 26.

It will be understood that the apparatus heretofore described and illustrated in the accompanying drawing is given by way of example only and represents only one embodiment of the present invention and that the present invention as expressed in the appended claims may be embodied in other forms of apparatus.

In particular, it will be understood that the apparatus according to the present invention is not limited to the control of flow in gas mains, but may be applied to control the flow of air or gas to oil wells for air lift pumping or for reestablishing rock pressure or applied to control of liquid in a main by a gaseous pressure in the pilot line.

It will be understood, moreover, that hunting may be suppressed by connecting a chamber to pipe 26 in place of the orifice plate 34.

Having thus described my invention, I claim:

1. A flow limiting apparatus comprising a main, a valve in said main, an auxiliary pipe having fluid normally flowing therein, means whereby pressure fluid from said auxiliary pipe may operate said valve to affect the flow of fluid therethrough, and means for varying the pressure in said auxiliary pipe in response to variation in the flow in said main, said last means including a flow restriction in said auxiliary pipe prior to said first means, an automatic valve in said auxiliary pipe following said first means and a second flow restriction in said auxiliary pipe following said automatic valve in the direction of flow and having a greater flow capacity than the said restriction in the auxiliary pipe.

2. A flow limiting apparatus comprising a main, a valve in said main, an auxiliary pipe having fluid normally flowing therein, means whereby fluid in said auxiliary pipe may operate said valve to affect the rate of flow of fluid therethrough, means for varying the pressure in said auxiliary pipe in response to the variations in flow in said main, said last means including a flow restriction in said auxiliary pipe prior to said first means and an automatic valve in said auxiliary pipe following said first means, and a pressure regulator at the intake of said auxiliary pipe.

3. A flow limiting apparatus comprising a main, a valve in said main, an auxiliary pipe having fluid normally flowing therein, means whereby pressure fluid from said auxiliary pipe may operate said valve to affect the flow of fluid therethrough, means for varying the pressure in said auxiliary pipe in response to variation in the flow in said main, said last means including a flow restriction in said auxiliary pipe prior to said first means, an automatic valve in said auxiliary pipe following the said first means and a second flow restriction in said auxiliary pipe following said automatic valve in the direction of flow and having a greater flow capacity than the said restriction in the auxiliary pipe, and a pressure regulator at the intake of said auxiliary pipe.

4. A flow limiting apparatus comprising a main, an auxiliary pipe having fluid normally flowing therein, two flow restrictions in said auxiliary pipe, the second of said restrictions in the direction of flow having greater capacity for fluid than the first, an automatic valve in said auxiliary pipe intermediate said restrictions, a valve in said main, means tending to hold said second valve in open position, a diaphragm operating connections between said diaphragm and said second valve, connections subjecting said diaphragm to pressure in said auxiliary pipe at a point intermediate said automatic valve and the first of said restrictions in a direction tending to close said second valve and means for varying the position of said automatic valve in response to the changes in the rate of flow in said main.

In testimony whereof I affix my signature.

EARL S. RUSH.